United States Patent [19]

Hager et al.

[11] Patent Number: 4,975,288

[45] Date of Patent: Dec. 4, 1990

[54] METHOD FOR MAKING CENTER-FILLED CHEWING GUM

[75] Inventors: Walter J. Hager, Mississauga; Gary C. Chappell, Oshawa, both of Canada

[73] Assignee: Warner-Lambert Company, Morris Plains, N.J.

[21] Appl. No.: 423,319

[22] Filed: Oct. 18, 1989

Related U.S. Application Data

[62] Division of Ser. No. 130,251, Dec. 8, 1987.

[51] Int. Cl.$^5$ .......................... A23G 3/00; B29C 47/00
[52] U.S. Cl. ..................................... 426/5; 425/133.1; 425/463; 426/284; 426/516
[58] Field of Search ....................... 426/5, 3, 516, 517, 426/284; 425/131.1, 133.1, 463

[56] References Cited
U.S. PATENT DOCUMENTS 4,399,154  8/1983  Puglia et al. ............................ 426/5

Primary Examiner—George Yeung
Attorney, Agent, or Firm—Carl W. Battle

[57] ABSTRACT

An apparatus and method for making center-filled chewing gum, in which product having up to at least 35–40% by weight of center fill can be produced. The apparatus comprises a novel extruder barrel and nozzle arrangement (11) which extrudes a tubular rope of gum (G) through an annular orifice (30), and at the same time supplies a center-fill material (F) to the hollow interior (V) of the tubular rope through a central nozzle (20,21) concentric with the orifice. The center-fill material is fed into the hollow interior of the gum rope at a rate sufficient to just fill the void produced in the gum rope as it is extruded through the nozzle, and without exerting a compressive pressure thereon. With this apparatus and method, center-filled chewing gum can be produced with up to at least 35–40% by weight of center-fill material and at the same time uniform wall thickness and consistency for the center-filled product can be maintained.

3 Claims, 4 Drawing Sheets

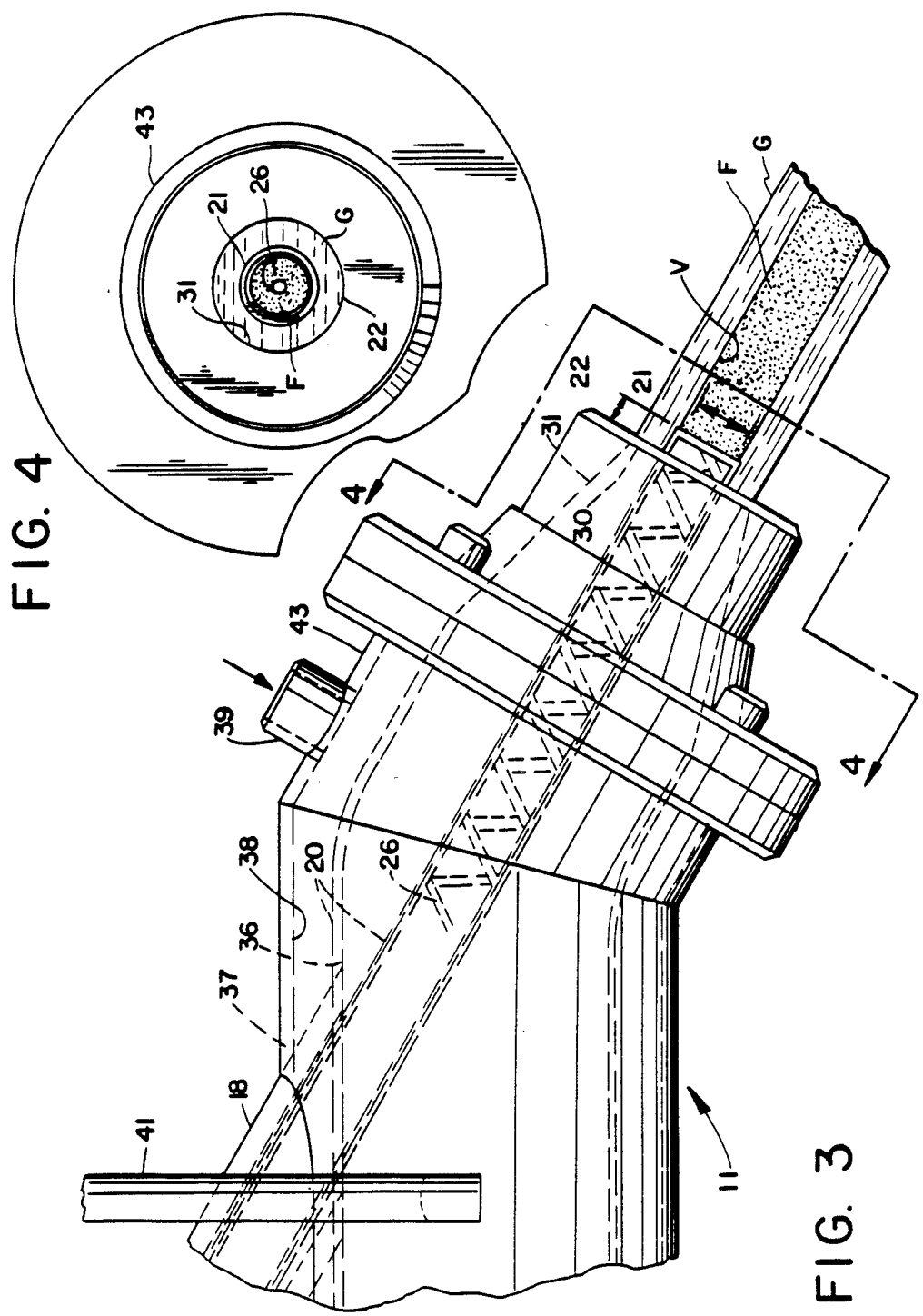

METHOD FOR MAKING CENTER-FILLED CHEWING GUM

This is a divisional of copending application Ser. No. 07/130,251, filed on Dec. 8, 1987.

BACKGROUND OF THE INVENTION

This invention relates to apparatus and methods for forming chewing gums. More particularly, the present invention relates to a novel and improved method and apparatus for filling the centers of chewing gum pieces, and also to an improved center-filled chewing gum.

PRIOR ART

Various apparatus, methods and formulations are known in the prior art for making center-filled chewing gum. Exemplary of some such prior art teachings are U.S. Pat. Nos. 3,806,290, 3,857,963 and 3,894,154, all to GRAFF, et. al., and owned by the applicant for the present invention. U.S. Pat. Nos. 3,806,290 and 3,857,963 relate to an apparatus and method, respectively, for forming center-filled chewing gum, in which concentric nozzles are disposed to form a tubular rope of chewing gum that is filled by pumping a center-fill material under pressure through the innermost of the concentric nozzles. U.S. Pat. No. 3,894,154 discloses a suitable example of a center-filled chewing gum having a liquid fill.

U.S. Pat. No. 4,543,769 to SCHMITZ discloses an apparatus for forming individual gum pieces from a rope of center-filled gum, and U.S. Pat. No. 4,513,012 to CARROLL, et. al., discloses a center-filled chewing gum in which the center-fill comprises a powdered material.

Various other machines and methods are known in the prior art for making center-filled chewing gum, but all such prior art teachings known to applicant rely upon pressurized filling to force the center-fill material into the hollow rope of gum.

Although such prior art apparatus and methods perform satisfactorily for the intended purpose, it is not possible to achieve more than about 12-17%, by weight, of center fill material in the gum piece and still maintain satisfactory quality in the finished chewing gum pieces. For instance, at greater ratios the wall thickness of the outer gum shell may have uneven thickness, or other unsatisfactory deviations in uniformity and consistency may result.

DISCLOSURE OF THE INVENTION

Accordingly, it is an object of this invention to provide apparatus and method for making center-filled chewing gum in which the fill material comprises about 35-40%, by weight, of the chewing gum.

Another object of the invention is to provide center-filled chewing gum pieces having a center fill which comprises up to about 35-40%, by weight, of the gum piece.

A further object of the invention is to provide an apparatus and method for making center-filled chewing gum, in which the center-fill material is introduced into the hollow interior of a tubular gum rope without any compressive pressure being applied to the fill material.

A more specific object of the invention is to provide an apparatus for making center-filled chewing gum, in which the apparatus has a pair of concentric tubes arranged to form a nozzle having an annular orifice through which gum is extruded to form a hollow, tubular rope of gum, and a center opening through which the center fill material is caused to flow concurrently with formation of the tubular rope of gum. The center fill material enters and fills the void created by formation of the tubular rope without any compressive pressure being applied to the center fill material to cause it to fill the void.

A further specific object of the invention is to provide a method of making center-filled chewing gum, in which gum is extruded through an annular nozzle to form a tubular rope of gum, and a center-fill material is simultaneously caused to flow through a concentrically disposed center nozzle to fill the void created upon formation of the tubular rope of gum, the center-fill material being advanced at a rate sufficient just to fill the void and without any compressive pressure being applied thereto as the void is filled.

These and other objects and advantages of the invention are achieved by the use of a unique extruder barrel nozzle having concentric inner and outer tubes defining an annular orifice therebetween through which gum is extruded to form a tubular rope of gum, and a central inner orifice through which fill material is caused to flow to fill the hollow interior of the gum rope. The volumetric rate of flow of the fill material is adjusted and regulated relative to the volume of the hollow interior of the gum being extruded such that the fill material just fills the hollow interior and does not produce any compressive force or pressure in the hollow interior of the gum rope. When a powdered fill is used, the powder is advanced through the inner concentric tube and into the hollow interior of the gum rope by use of a screw conveyor or other suitable conveying means, and when a fluid fill is used, flow of the fluid can be initiated with a pump means and then simply permitted to flow under the influence of gravity into the hollow interior of the gum rope.

In one specific example of a machine constructed in accordance with the invention, the outer tube has an inner diameter of about two inches, and the inner tube has an outer diameter of about one and one-eighth inches and projects beyond the end of the outer tube by about one-half inch. These dimensions will produce center-filled gum pieces having about 35% by weight of center-fill in the gum pieces. By increasing the outer diameter of the inner tube to one and one-quarter inches, the percentage of center fill is increased to 40%.

BRIEF DESCRIPTION OF THE DRAWINGS

The foregoing and other objects and advantages of the invention will become apparent when the following detailed description is taken in conjunction with the drawings, wherein like reference characters refer to like parts throughout the several views, and wherein:

FIG. 3 is an enlarged fragmentary view in side elevation of the extruder barrel nozzle of the invention;

FIG. 4 is a fragmentary end view of the nozzle and is taken along line 4—4 in FIG. 3;

DESCRIPTION OF THE PREFERRED EMBODIMENTS

Figure 1:
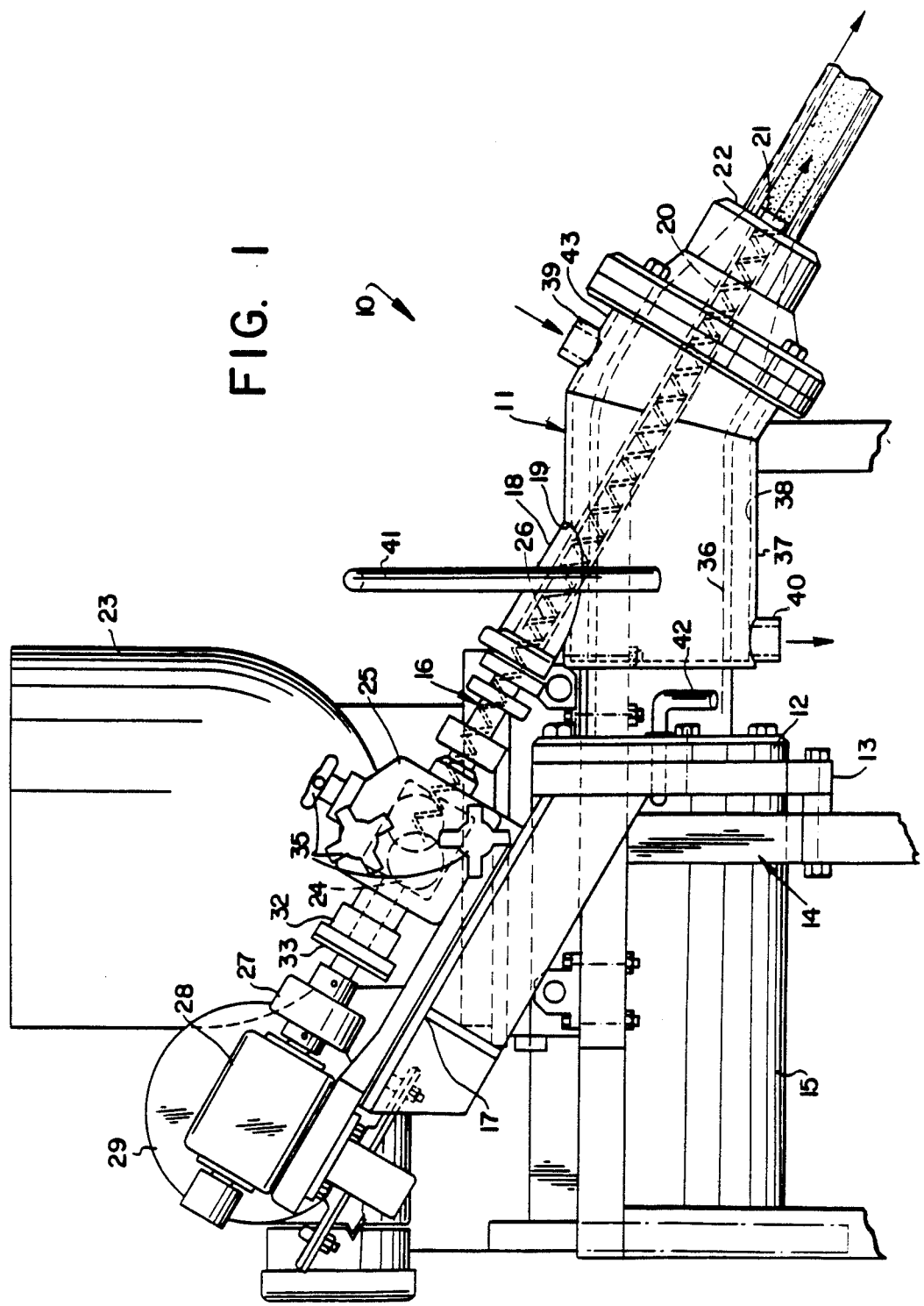
FIG. 1 is a fragmentary view in side elevation of a machine constructed in accordance with the invention.
Figure 2:
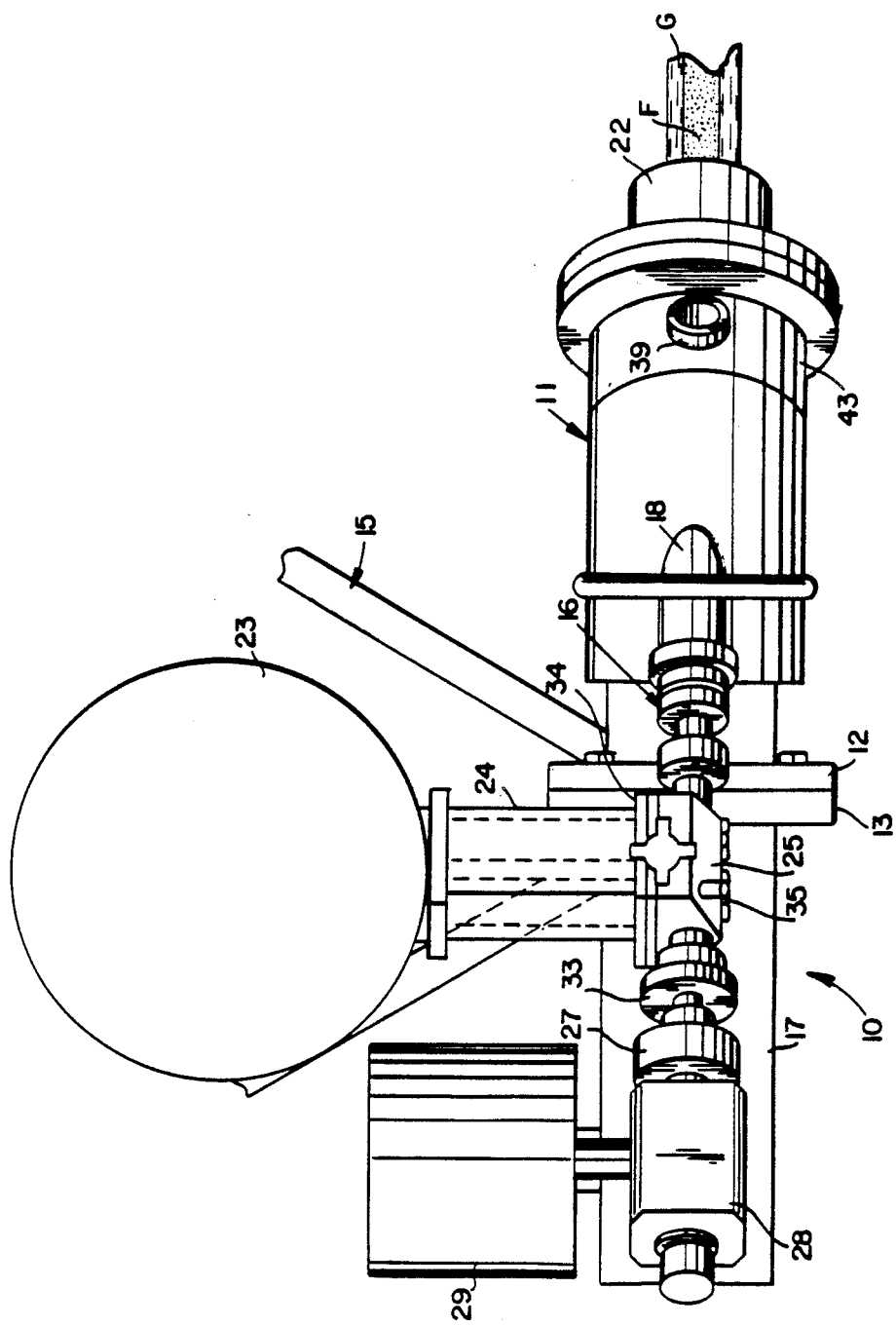
FIG. 2 is a fragmentary top plan view of the machine of FIG. 1.

The apparatus for producing center-filled chewing gum having up to 35-40% by weight of center-fill is shown at 10 in FIGS. 1 and 2, and comprises an extruder barrel nozzle 11 secured by a mounting flange 12 to an extruder connecting plate 13 fixed on a support frame 14. The extruder barrel nozzle 11 is connected to receive gum from a conventional extruder 15 (as used to produce applicant's chewing gum product known as "Freshen Up", for example), also supported on the support frame.

An extruder fill tube assembly 16 is supported at an angle on an inclined support platform 17 and includes a fill tube adapter 18 welded or otherwise suitably secured in an opening 19 in the side of the extruder barrel nozzle 11. An extruder fill tube 20 is supported concentrically within the adapter and projects concentrically through the extruder barrel nozzle to an outlet end 21 spaced beyond the outlet end 22 of the extruder barrel nozzle.

A holding vessel 23 is supported on the support frame to one side of the extruder fill tube assembly for holding a supply of powdered center-fill material F, and a K-Tron screw housing 24 is connected between the holding vessel and a powder screw feed chamber 25 to supply the powdered center-fill from the holding vessel to the powder screw feed chamber 25.

An elongate right hand single start screw 26 extends through the powder screw feed chamber 25 and fill tube 20 to convey the powdered fill material F along the fill tube to the outlet end thereof, where the material enters and fills the void V left in the center of the rope of gum G extruded through the nozzle 11.

The screw 26 is driven through a drive coupling 27 and Browning right angle drive gear box 28 by a motor 29. The speed of the motor and thus the speed of rotation of the screw and rate of advance or delivery of the fill material conveyed thereby are adjustable so that just enough material is conveyed to the outlet end of the fill tube to completely fill the void left in the center of the gum rope as it is being extruded through the nozzle. In other words, as the gum G is extruded through the annular orifice 30 defined between the outer tube or housing 31 of the nozzle and the inner fill tube, a void is created. This void is at a slightly reduced pressure and the gum is also continuously being conveyed away from the extruder nozzle for subsequent operations to be performed thereon. The volume of the void is known in advance and only enough fill material is conveyed through the fill tube to occupy this volume and prevent collapse of the wall of the gum rope. In effect, the fill material is being "poured" into the hollow interior of the gum rope, as compared with prior art systems in which the fill material is pumped under positive pressure into the hollow interior of the extruded gum.

As seen best in FIGS. 1 and 2, the fill tube assembly 16 includes an air gland 32 and end seal plate 33 connected between the drive coupling 27 and feed screw 26. Further, the screw housing 24 and powder screw feed chamber 25 are secured to a mounting flange 34 on the inclined support 17 by means of a plurality of easy to manipulate screw knobs 35 whereby the screw housing, powder feed chamber and fill tube assembly may be quickly and easily connected and disconnected relative to one another.

The extruder barrel nozzle 11 has spaced apart inner and outer walls 36 and 37 defining an annular space 38 therebetween, and an inlet fitting 39 and outlet fitting 40 communicate with the space for circulating heated water or other fluid through the space to maintain the proper consistency of the gum as it is being extruded. Moreover, a carrying handle 41 is provided on the extruder barrel nozzle 11 to facilitate handling of the nozzle when it is attached to and removed from the support frame, and a locating pin 42 is provided to assist in accurately and rapidly aligning the extruder barrel nozzle to the extruder connecting plate 13 during assembly of the components. Further, the outlet end portion 43 of the extruder barrel nozzle is turned downwardly at an angle to match the angle of the fill tube assembly in order to achieve concentricity of these elements at the discharge point for the gum and fill material.

Figure 5:
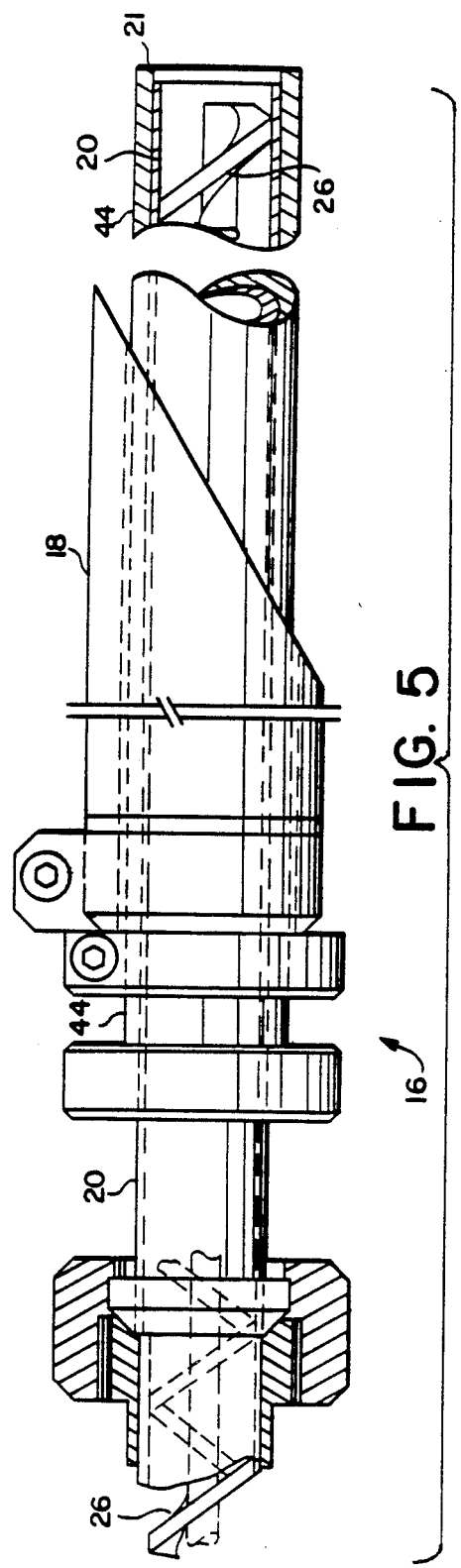
FIG. 5 is a greatly enlarged view, with portions broken away and portions shown in section, of the inner concentric tube assembly.

With reference to FIG. 5, the extruder fill tube assembly 16 includes a fill tube sleeve 44 extending concentrically between the extruder fill tube 20 and adapter 18. All of the components of the fill tube assembly, including the fill tube adapter 18, fill tube 20 and fill tube sleeve 44 are preferably made of stainless steel, although other suitable materials may be used.

Figure 6:
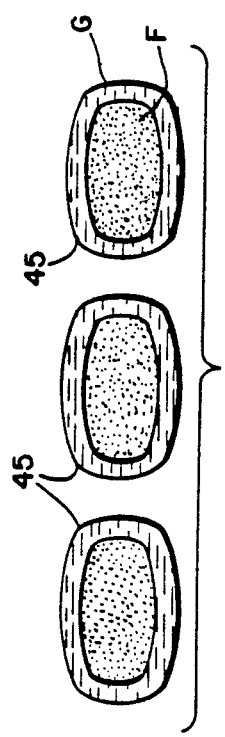
FIG. 6 is a schematic view showing in section a plurality of pieces of gum produced in accordance with the invention.

Several pieces of gum produced with the apparatus of the invention are shown schematically at 45 in FIG. 6. The center-filled chewing gum produced with the apparatus and method of the invention represents a significant improvement over prior art center-filled chewing gum in that the present invention enables up to at least 35-40% center-fill, by weight, as compared with only about 11-17% in the prior art.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

We claim:

1. A method for forming center-filled chewing gum which comprises the steps of:
   (A) providing an apparatus which comprises:
      (a) an extruder barrel nozzle means with an annular orifice and an outer tube;
      (b) a straight center-fill tube extending concentrically within and outwardly through the annular orifice and being concentrically disposed within the outer tube, the center-fill tube having an outside diameter equal to at least one-half of the inside diameter of the outer tube;
      (c) a conveying means comprising a straight rotating screw conveyor rotatable in the center-fill tube;
   (B) extruding a rope of chewing gum through the annular orifice of the extruder barrel nozzle to form a gum rope with a hollow interior of predetermined volume;
   (C) pouring a center-fill material from the center-fill tube with the straight rotating screw conveyor into the hollow interior of the gum rope as the gum rope is being extruded; and
   (D) regulating the straight rotating screw conveyor to establish a predetermined volumetric rate relative to the rate of extrusion of the gum rope sufficient to just fill the hollow interior of the gum rope without exerting compressive pressure thereon.

2. The method according to claim 1, wherein the center-fill material comprises a liquid.

3. The method according to claim 1, wherein the center-fill material comprises a powder.

* * * * *